(12) United States Patent
Jackson et al.

(10) Patent No.: US 10,548,345 B2
(45) Date of Patent: Feb. 4, 2020

(54) WATERLESS VACUUM BASED SMOKING APPARATUS

(71) Applicants: Alexander M Jackson, Silver Spring, MD (US); Austin J. Nam, Clarksville, MD (US)

(72) Inventors: Alexander M Jackson, Silver Spring, MD (US); Austin J. Nam, Clarksville, MD (US)

( * ) Notice: Subject to any disclaimer, the term of this patent is extended or adjusted under 35 U.S.C. 154(b) by 0 days.

(21) Appl. No.: 16/034,342

(22) Filed: Jul. 12, 2018

(65) Prior Publication Data

US 2018/0317543 A1  Nov. 8, 2018

Related U.S. Application Data

(63) Continuation-in-part of application No. 15/075,085, filed on Mar. 18, 2016, now Pat. No. 10,045,560.

(60) Provisional application No. 62/134,761, filed on Mar. 18, 2015.

(51) Int. Cl.
| | | |
|---|---|---|
| *A24F 47/00* | (2006.01) | |
| *A24F 1/00* | (2006.01) | |
| *B01D 39/20* | (2006.01) | |
| *B01D 46/00* | (2006.01) | |
| *B01D 46/24* | (2006.01) | |
| *A24F 7/04* | (2006.01) | |
| *A24D 1/14* | (2006.01) | |
| *A24F 3/00* | (2006.01) | |
| *A24F 5/10* | (2006.01) | |

(52) U.S. Cl.
CPC .............. *A24F 1/00* (2013.01); *A24D 1/14* (2013.01); *A24F 3/00* (2013.01); *A24F 5/10* (2013.01); *A24F 7/04* (2013.01); *B01D 39/2065* (2013.01); *B01D 46/0038* (2013.01); *B01D 46/24* (2013.01); *B01D 2279/40* (2013.01)

(58) Field of Classification Search
CPC ...... A24F 1/02; A24F 1/24; A24F 1/30; A24F 47/002; A24F 7/04
See application file for complete search history.

(56) References Cited

U.S. PATENT DOCUMENTS 10,045,560 B2 * 8/2018 Jackson .................... A24F 1/00

* cited by examiner

*Primary Examiner* — Thomas L Dickey

(57) ABSTRACT

A waterless vacuum based smoking apparatus utilizes vacuum created by translation of a cartridge within a chamber of a sheath body in order to accumulate within the chamber smoke or vapor from a combustible or vaporizable substance, which can then be expelled for inhalation by a user by reversing the translation of the cartridge within the chamber. Measurement and tracking functionalities are provided so that a user may accurately assess and monitor their intake.

19 Claims, 7 Drawing Sheets

WATERLESS VACUUM BASED SMOKING APPARATUS

The current application is a continuation-in-part (CIP) application of a U.S. non-provisional application Ser. No. 15/075,085 filed on Mar. 18, 2016. The U.S. non-provisional application Ser. No. 15/075,085 claims a priority to the U.S. Provisional Patent application Ser. No. 62/134,761 filed on Mar. 18, 2015.

FIELD OF THE INVENTION

The present invention relates to smoking devices. In particular, the present invention relates to a handheld gravity style smoking apparatus that functions without the use of water or other non-combustible liquids.

BACKGROUND OF THE INVENTION

Smoking apparatuses come in many shapes and sizes. These devices often include a water filtration chamber or other filtration aspect. Whether or not a filter is included, all pipes include the use of a smoking content holder or bowl that leads to a primary chamber that fills up with smoke and sits in between the bowl and a mouth piece opening. As such, chambers with larger volumes are capable of holding larger volumes of smoke.

A popular smoking apparatus more commonly known as a "gravity pipe," generally involves the use of water to create a vacuum within the device in order to draw large amount of thick smoke into the primary chamber. Gravity pipes generally involve the use of two different sized containers, with the larger sitting face up and being filled with water and with the smaller having a bowl with smoking contents attached over the mouth piece or top opening. The smaller container will be placed into the larger container and comprise an aperture near the bottom. When the smaller container is placed in the larger container, the water will pass through the aforementioned aperture and fill up the smaller container. When in this position, users then light the smoking contents in the bowl and simultaneously lift the smaller container upwards and out of the water. As the smaller container rises, water will drain through the aforementioned aperture and create a vacuum. As water exits, the air pressure will draw smoke into the smaller container, replacing the contents within volumetric space to which the water previously resided. The vacuum will force air through the bowl, causing the smoking substance to continually burn. At this point, users will generally remove the bowl from over the top opening, place their mouth over it, and inhale the accumulated smoke while simultaneously lowering the smaller container back into the larger container and water.

While gravity pipes are considered to be very effective smoking tools, the use of water often creates a messy environment, elongates preparation time, and requires an extensive cleaning process. In addition, users often complain that they are unable to control the amount of smoke that they produce and intake into their lungs. As such, there exists a need to a gravity style smoking apparatus that does not require the use of water, is easy to clean, and allows users to measure and control how much smoke they would like to produce and inhale per use.

It is therefore an objective of the present invention to introduce a waterless gravity style smoking apparatus. The present invention uses air pressure in order to draw in and accumulate smoke in such a way that is analogous to the previously described method, but without the use of water or other non-combustible liquids. In addition, the present invention utilizes a measurement tool that allows for dosage control. The present invention gives users control over the entire smoking process and is an all in one, portable smoking device.

The present invention is a waterless gravity style smoking apparatus that forms a sealed vacuum to create internal suction within the device so that it can draw the smoke into a chamber that increases in size as the magazine (smaller) compartment of the device is lowered out of the outer (larger) sheath compartment. With this, the user can then inhale the smoke when they are satisfied with the quantity of smoke in the chamber. A lighter may be placed inside one of the device's cavities in order to place its flame next to the bowl. Thus, when the magazine is pulled down, suction is created by a vacuum that simultaneously pulls air and the lighter's flame into the bowl.

The present invention will be completely sealed, with no openings, preventing odors from leaving the device. While most smoking devices are difficult to clean, the physical components of the present invention are fully detachable with surfaces that are easy to reach and sanitize. Furthermore, the present invention is machine washable and quite durable. Unlike many other smoking devices which are generally made of glass or other fragile materials, the present invention is made out of one or more flame retardant materials that may include but are not limited to stainless steel, ceramics, heat resistant polymers, heat resistant composites, and more.

Many common smoking devices provide users with harsh hits that hurt and burn the mouth, throat, and lungs. The present invention pulls smoke into a chamber for the user to inhale when ready. This eliminates the chance of harsh hits that develop due to the closeness of the flame during inhalation and temperature of the smoke.

The present invention may come in a multitude of different colors. As well, any image may be printed on to the outer and/or inner surfaces of each piece, upon request. Most of the present inventions primary components are pill shaped or rectangular pieces with two opposite facing rounded sides. Each component is shaped and dimensioned to fit together with in the appropriate manner. The present invention is small and portable. It can fit in the average sized jacket pocket and is relatively flat in design, similar to a flask. This shape allows users to easily carry and conceal the device. Due to the components and arrangements of the apparatus, as well as the material choice, users do not have to worry about smell or the possibility of it breaking. The present invention acts like a gravity pipe but is more economically efficient with a user's smoking material, compared to most other devices (excluding vaporizers).

DETAIL DESCRIPTIONS OF THE INVENTION

Figure 1:
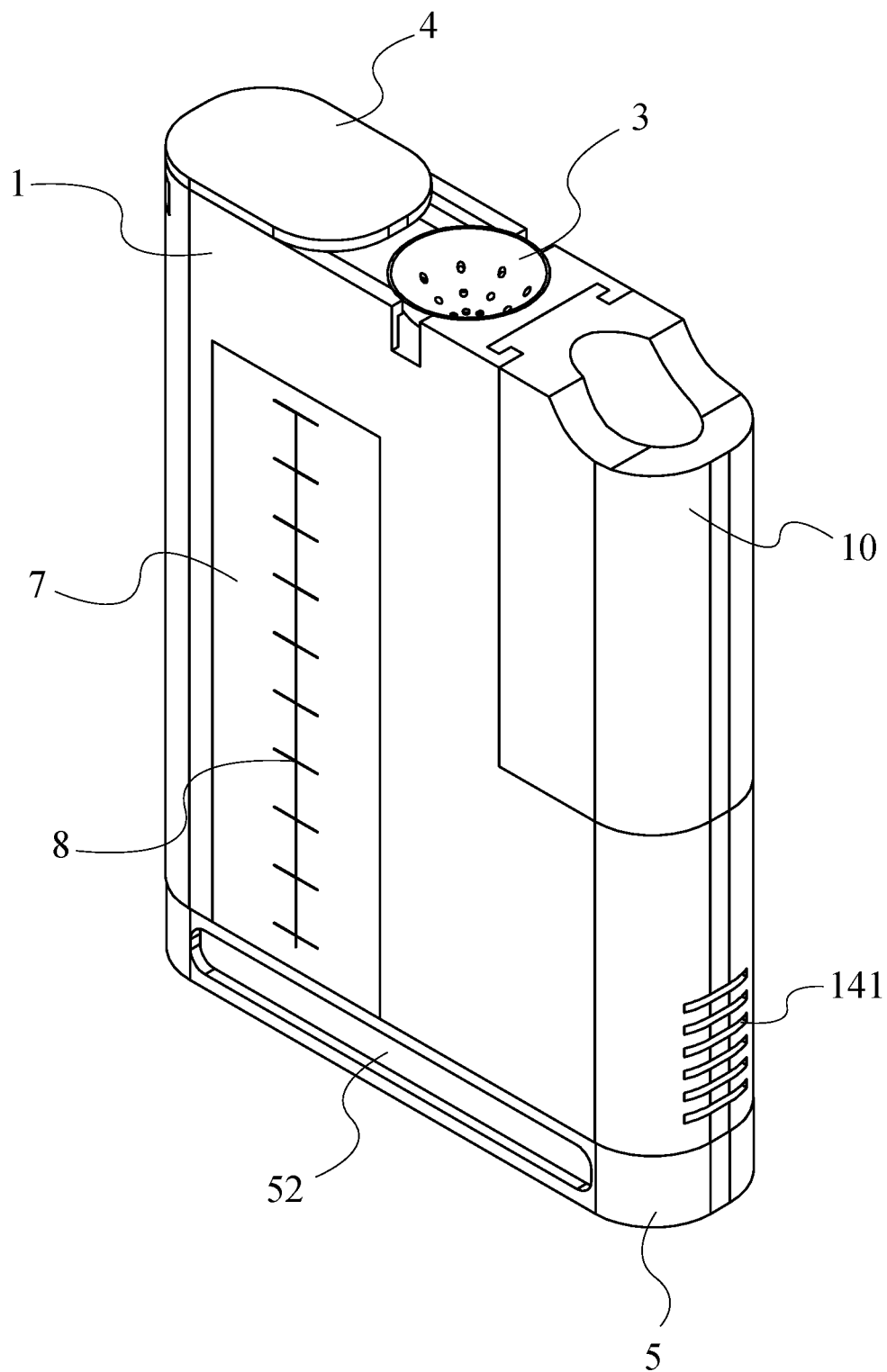
FIG. 1 is a perspective view of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a waterless smoking apparatus that utilizes vacuum pressure to accumulate smoke from a burning herbal product into a chamber, which is then released by positive pressure for inhalation by a user. It is additionally contemplated that the present invention may be embodied and utilized in a similar manner for consumption and measurement of vapor produced from personal vaporizer devices.

Referring to FIGS. 1-5, the present invention generally comprises a sheath body 1, a cartridge 2, and a cartridge anchor 5. The sheath body 1 comprises a cartridge chamber 11, an intake hole 12, a mouthpiece hole 13, a top end 15, and a bottom end 16, while the cartridge 2 comprises a seal end 21, a storage cavity 22 and an open end 23.

The sheath body 1 is the primary structural component of the present invention which all other components interact with, are connected to or positioned within. In some embodiments, the sheath body 1 has a generally pill-like or oblong, rounded rectangular cross-sectional shape. In the preferred embodiment of the present invention, the sheath body 1 is relatively dimensioned to itself in order to form a generally flask-like shape. It is contemplated that the aforementioned pill-like cross sectional shape of the sheath body 1 is not of paramount importance to the present invention and any other cross-sectional shape may be embodied which allows for the general function of the present invention, such as, but not limited to, circular, ovular, square, or another shape. In some embodiments, the sheath body 1 may be manufactured as multiple pieces that are joined together to form the overall desired form of the sheath body 1. For example, the sheath body 1 may comprise a first sheath portion and a second sheath portion connected adjacent to each other. The first sheath portion and the second sheath portion may be connected to each other laterally or in any other manner. The first and second sheath portions may comprise a female connection and a male connection in order to join the first sheath portion and the second sheath portion together. The first sheath portion and the second sheath portion may alternatively be connected together through fasteners, magnets or other means.

Figure 2:
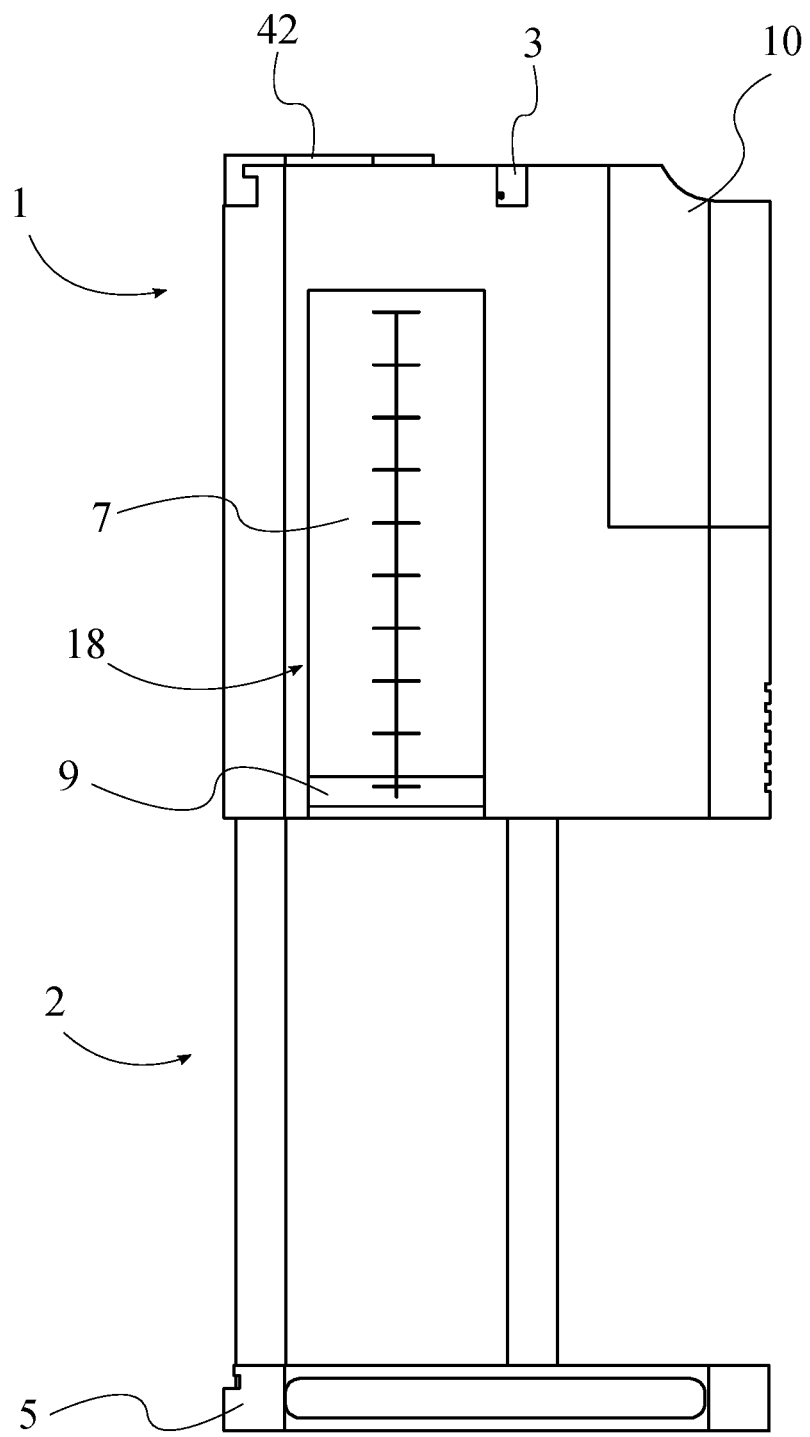
FIG. 2 is a perspective view of the present invention with the cartridge extended.

The top end 15 and the bottom end 16 of the sheath body 1 are joined by a lateral sheath wall. The cartridge chamber 11 is positioned within the sheath body 1 and traverses into the sheath body 1 from the bottom end 16 of the sheath body 1 toward the top end 15 of the sheath body 1. In general, the cartridge 2 is engaged into the cartridge chamber 11. In various embodiments, the specific means of engagement of the cartridge 2 into the cartridge chamber 11 may vary. In some embodiments, the cartridge 2 or a portion of the cartridge 2, such as the seal end 21, may be permanently captive within the cartridge chamber 2. In some embodiments, the cartridge 2 may be completely removable from the cartridge chamber 2 by the user. In the preferred embodiment, the cartridge 2 is slidably engaged into the cartridge chamber 11, and the reciprocal sliding action of the cartridge 2 within the cartridge chamber 11 is responsible for providing the vacuum and positive pressure in order to facilitate the smoking function of the present invention. FIG. 2 shows the cartridge in the extended position. It is further contemplated that in other embodiments, various other configurations of engagement between the cartridge 2 and the cartridge chamber 11 may be comprised in the present invention in order to facilitate the purpose and spirit of the present invention.

Figure 3:
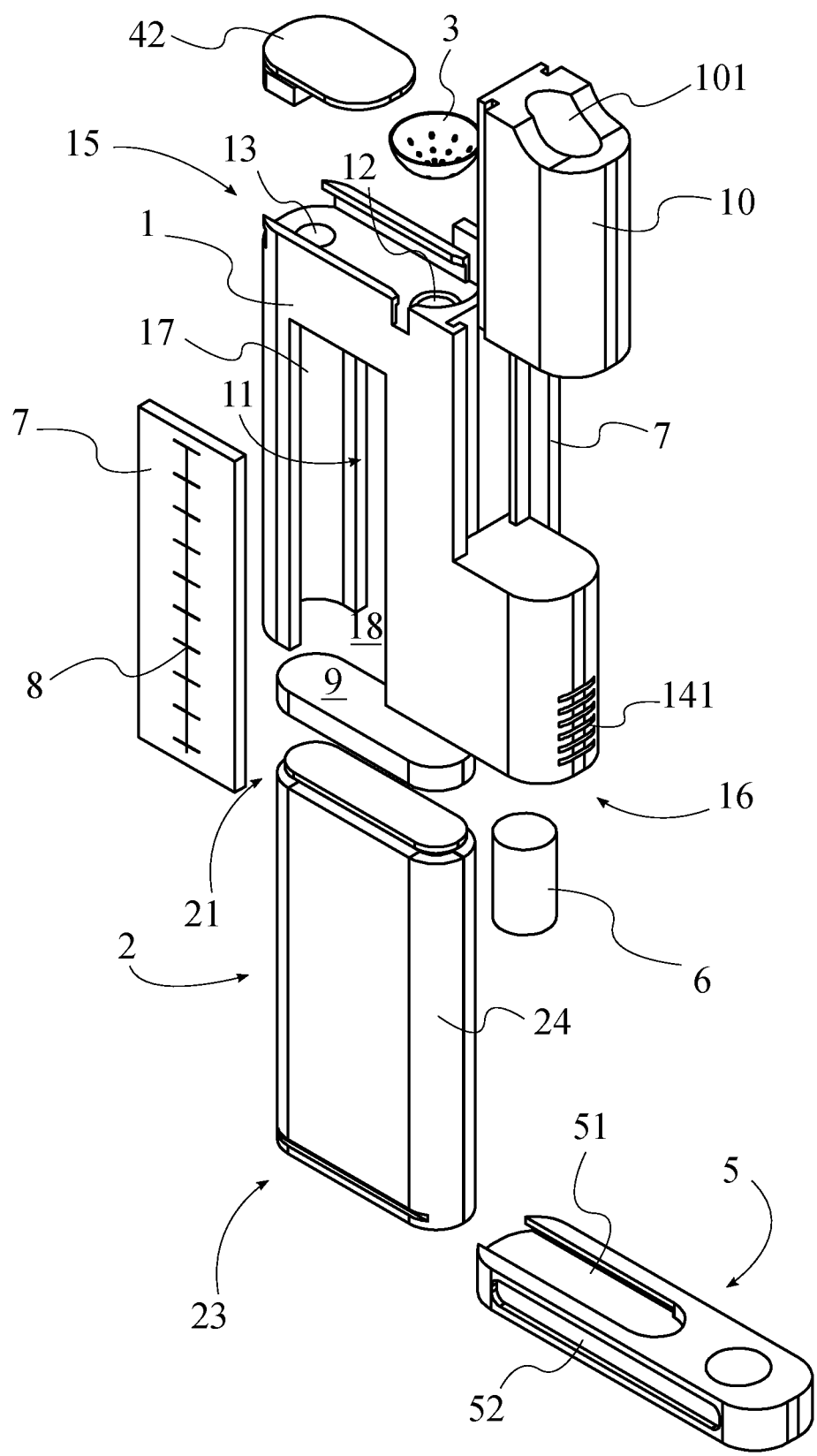
FIG. 3 is an exploded perspective view of the present invention.

As seen in FIGS. 2-3, some embodiments of the present invention further comprise at least one viewing port 18 and at least one translucent cover 7. Each of the viewing ports 18 laterally traverse through the sheath body 1 into the cartridge chamber 11, and each of the translucent covers 7 are attached within one of the viewing ports 18. The word lateral should be understood to be able to include any direction perpendicular to the vertical direction between the top end 15 and the bottom end 16, but more specifically and preferably either along the length or the width of the cross section of the sheath body 1.

Additionally, in some embodiments at least one of the translucent covers 7 may comprise a scale 8, or another measurement tool. The scale 8 comprises a plurality of evenly spaced markings and is oriented vertically between the top end 15 and the bottom end 16, wherein the vertical direction is defined as the direction of translation of the cartridge 2 within the cartridge chamber 11. The scale 8 enables the user to measure the volume of smoke within the cartridge chamber 11 in order to specify a dosage. The user simply pulls on the cartridge anchor 5, drawing the cartridge 2 away from the top end 15 of the sheath body 1 until the seal end 21 visibly aligns with a desired marking on the scale 8.

An outer wall 24 of the cartridge 2 is dimensioned similarly to the inner wall 17 of the cartridge chamber 11, and the seal end 21 of the cartridge 2 is hermetically sealed within the cartridge chamber 11 between the top end 15 of the sheath body 1 and the open end 23 of the cartridge 2. The hermetic seal ensures that smoke and odor do not undesirably or unintentionally escape from within the cartridge chamber 11. In some embodiments of the present invention, the hermetic seal is achieved through a seal attachment 9 that is attached to the seal end 21 of the cartridge 2. A sealant receiving groove extends into and around the entire perimeter of the lateral surface of the cartridge 2, just below the seal end 21 of the cartridge 2. The sealant receiving groove is shaped and dimensioned to receive an elastic sealant that tightly fits into it. Thus, an outer perimeter of the seal attachment 9 is dimensioned similarly to the inner wall 17 of the cartridge chamber 11 in order to hermetically seal the seal attachment 9 against the inner wall 17. When fit into the sealant receiving groove, the outer dimensions of the seal attachment 9 create an airtight seal between itself and the inner lateral surface of the cartridge chamber 11 chamber, while still allowing the magazine to translate upwards and downwards. The material of the seal attachment 9 may be rubber, plastic, or any other appropriate material for maintaining a seal between the cartridge 2 and the inner wall 17 of the cartridge chamber 11 while reducing friction as much as possible.

Figure 5:
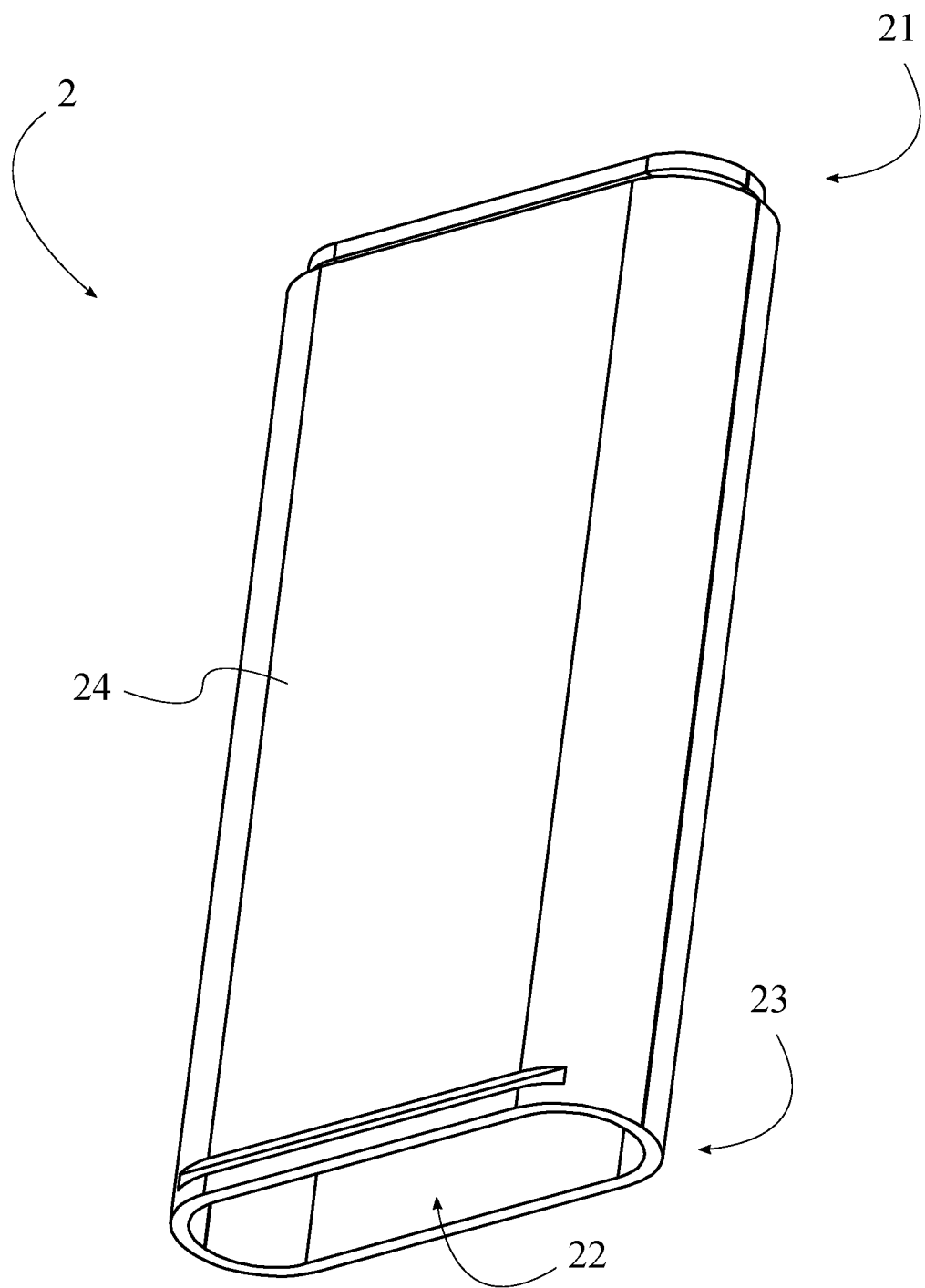
FIG. 5 is a lowered perspective view of the cartridge.

As can be seen in FIG. 5, the storage cavity 22 traverses into the cartridge 2 from the open end 23 toward the seal end 21. The storage cavity 22 allows the user to store any desired accessories or other items within the present invention for ease of transportation and access. As seen in FIG. 3, the cartridge anchor 5 is removably attached to the cartridge 2 at the open end 23, wherein the storage cavity 22 is sealed when the cartridge anchor 5 is attached to the cartridge 2. More particularly, in some embodiments, the cartridge anchor 5 is slidably engaged with the cartridge 2 at the open end 23 of the cartridge 2. In some embodiments, the perimeter of the cross section of the cartridge anchor 5 is dimensioned similarly to the perimeter of the cross section of the sheath body 1, thus the length and width of the cartridge anchor 5 are greater than that of the cartridge 2. The cartridge anchor 5 comprises a cartridge channel 51 that is shaped and dimensioned in order to receive the open end 23 of the cartridge 2, by engaging with a pair of grooves at the open end 23 of the cartridge 2. Additionally, in some embodiments, the cartridge anchor 5 comprises a grip 52 that is positioned laterally on the cartridge anchor 5, enabling the user to ergonomically grasp the cartridge anchor 5. Preferably, a pair of grips 52 is positioned parallel and opposite each other on each lateral side of the cartridge anchor 5. The grips 52 may be rubber strips, knurled portions of the cartridge anchor 5, bumps or other protrusions, or channels recessed into the side of the cartridge anchor 5.

Figure 4:
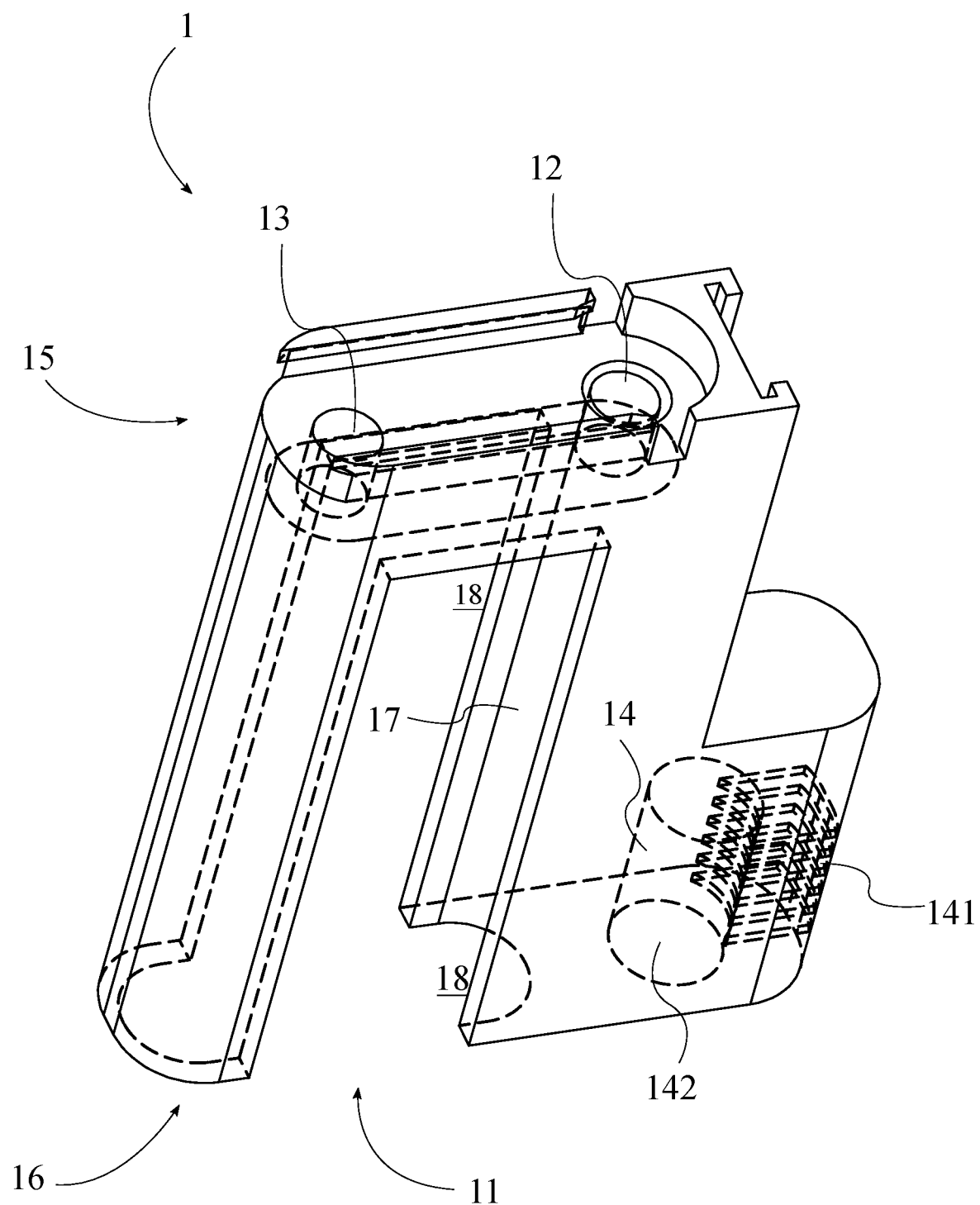
FIG. 4 is a perspective view of the sheath body with a quantity of hidden lines shown.

Referring to FIGS. 3-4, some embodiments of the present invention may additionally comprise an integral filter 6, while the sheath body further comprises a filter cavity 14. The filter cavity 14 traverses into the sheath body 1, and the filter 6 is positioned within the filter cavity 14. The filter cavity 14 comprises an intake port 141 and an exhaust port 142. The intake port 141 and the exhaust port 142 laterally traverse into the sheath body 1 and are positioned opposite to each other across the filter 6. After the user inhales a dose of smoke or vapor, the user may place their mouth over the intake port 141 and exhale into the filter 6 in order to prevent any odors from being distributed into the surrounding environment. In some embodiments, the filter 6 is a carbon fiber filter 6. In other embodiments, other filter 6 types may be used, such as, but not limited to, fiberglass filters, polyester and pleated filters, high efficiency particulate arrestance (HEPA) filters, or any type of filter which can adequately trap or eliminate smoke or other odor when the user breaths an inhaled dose through the filter 6. In some embodiments, the filter cavity 14 and the filter 6 may be contained within a separate filter compartment which may be removably attached to the sheath body. In various embodiments, the specific means of removable attachment of the filter compartment to the sheath may include, but is not limited to, magnetic attachment, geometric attachment, fasteners, hook and loop tape, or other means.

In general, the intake hole 12 and the mouthpiece hole 13 traverse into the cartridge chamber 11 in order to facilitate intake of smoke, vapor or other gaseous or otherwise fluidic substance through the intake hole 12 into the cartridge chamber 11 and subsequently expel the gaseous substance through the mouthpiece hole 13. The location of the intake hole 12 and the mouthpiece hole 13 in relation to the sheath body is not considered to be of particular importance and may vary in different embodiments so long as the aforementioned purpose is achieved. In some embodiments, the intake hole 12 and the mouthpiece hole 13 of the sheath body 1 each traverse through the top end 15 into the cartridge chamber 11, and the intake hole 12 and the mouthpiece hole 13 are furthermore laterally spaced apart from each other on the sheath body 1 in a direction coincident to the length of the sheath body 1, wherein the length of the sheath body 1 corresponds to the longer dimension of the rounded rectangular cross-sectional shape of the sheath body 1. In other embodiments, the intake hole 12 and/or the mouthpiece hole 13 may be positioned in locations on the sheath body 1 other than the top end 15, such as, but not limited to, traversing laterally into the sheath body 1 between the top end 15 and the bottom end 16.

Some embodiments of the present invention may further comprise a perforated bowl 3 and at least one hole cover 4. In such embodiments, the perforated bowl 3 may be positioned atop the intake hole 12, wherein the intake hole 12 traverses through the top end 15 of the sheath body 1 in such embodiments. The bowl has a bowed-in arcuate top surface which can hold smoking content or other substances. A plurality of apertures traverses vertically through the aforementioned bowed-in surface, allowing for air to pass into the cartridge chamber 11. The perforated bowl 3 and the mouthpiece hole 13 may furthermore be releasably covered by the at least one hole cover 4 in embodiments where the intake hole 12 and the mouthpiece hole 13 are both positioned at the top end 15 of the sheath body 1 and spaced apart from each other on the sheath body 1. In some embodiments, the perforated bowl 3 is rotatably connected or attached atop the intake hole 12. In some embodiments, a bowl receiving lip exists annularly along the inner surface of the intake hole 12, just below the top end 15 of the sheath body 1. The bowl receiving lip engages with an annular receiving channel, located on the underside of the perforated bowl 3, allowing the bowl to attach to the sheath with a snap fit. This snap fit allows the bowl to be easily attached and removed from the apparatus, as well as be rotated a full 360 degrees about its central axis when connected.

In some embodiments, the perforated bowl 3 is replaced by a vaporizer. The vaporizer may be configured for passing air of a specified temperature range over dry or wet herbs or other substances, or the vaporizer may be configured for heating liquids or other substances to the point of vaporization, or the vaporizer may be configured in another relevant and useful manner for use with other substances.

Figure 6:
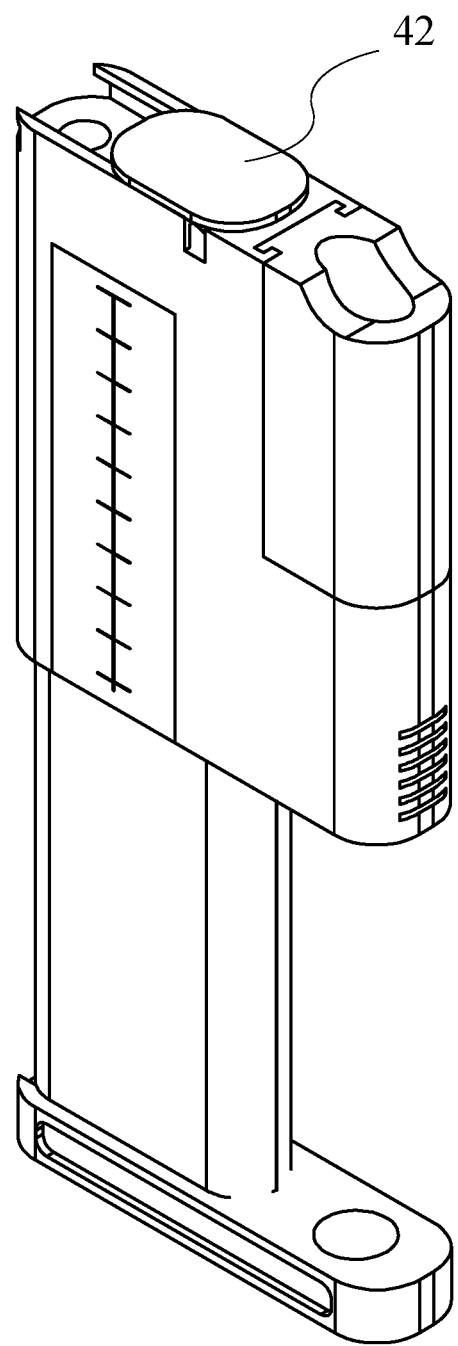
FIG. 6 is a perspective view of the present invention with the cartridge extended and with the sliding cover in the discharge position.

In some embodiments, the at least one hole cover 4 comprises a sliding cover 42. In this embodiment, the sliding cover 42 is slidably engaged at the top end 15 of the sheath body 1 between a filling position and a discharge position. In the filling position, the sliding cover 42 is positioned flush against the mouthpiece hole 13 so that while the user draws smoke or vapor into the cartridge chamber 11, none escapes through the mouthpiece hole 13. In the discharge position, the sliding cover 42 is positioned flush against the lip of the perforated bowl 3, so that no consumable material can fall out of the perforated bowl 3 while the user is inhaling the smoke or vapor through the mouthpiece hole 13. The user must manually move the sliding cover 42 between the filling position and the discharge position in order to utilize the present invention to accumulate within and inhale smoke or vapor from the cartridge chamber 11. The sliding cover 42 is shown in the filling position in FIGS. 1-2, and the sliding cover 42 is shown in the discharge position in FIG. 6.

In another embodiment, the at least one hole cover 4 comprises a bowl cover and a mouthpiece cover. The bowl cover is removably positioned flush against the lip of the bowl, and the mouthpiece cover is removably positioned flush against the mouthpiece hole 13. Thus, the perforated bowl 3 and the mouthpiece hole 13 may be covered or exposed independently from each other. In this embodiment, the bowl cover and the mouthpiece cover may be rotatably attached to the top end 15 of the sheath body 1 adjacent to their respective holes near a perimeter of the covers, resulting in a swiveling action that allows the covers to be rotated between a covered position and an open position.

Various embodiments of the present invention further comprise a lighter sheath 10 positioned adjacent to the perforated bowl 3. The lighter sheath 10 is provided in the present invention for convenience, enabling an all-in-one functionality. The receiving cavity 101 of the lighter sheath 10 may be shaped and dimensioned to accommodate any shape, style, or size of lighter as applicable. The lighter sheath 10 enables any combustible substance within the perforated bowl 3 to be ignited in an integral fashion due to the lighter's proximity to the perforated bowl 3. With a lighter is inserted into the lighter sheath 10, lighter wheel will be accessible allowing users to actuate the lighter, in order to produce a flame while drawing the cartridge 2 out of the cartridge chamber 11, resulting in the combustible material being ignited and smoke drawn into the cartridge 2 cavity through the intake hole 12. This allows users to actuate the lighter and simultaneously hold the present invention in the same hand.

In some embodiments, the lighter sheath 10 is integral to the construction of the sheath body 1, traversing into the sheath body 1 laterally adjacent to the intake hole 12 opposite the mouthpiece hole 13. In another embodiment, the lighter sheath 10 is a separate accessory and is removably attached to the sheath body 1 laterally adjacent to the intake hole 12 opposite the mouthpiece hole 13. Thus, the user may purchase or design and build various designs of lighter sheaths of various shapes and sizes, providing versatility in the type of lighter than can be used with the present invention. In another embodiment, the sheath body 1 is constructed with an integral lighter that cannot be removed, but may be refilled. It is contemplated that various restraining mechanisms may also be comprised in the present invention in order to secure a lighter within the lighter sheath 10.

Figure 7:
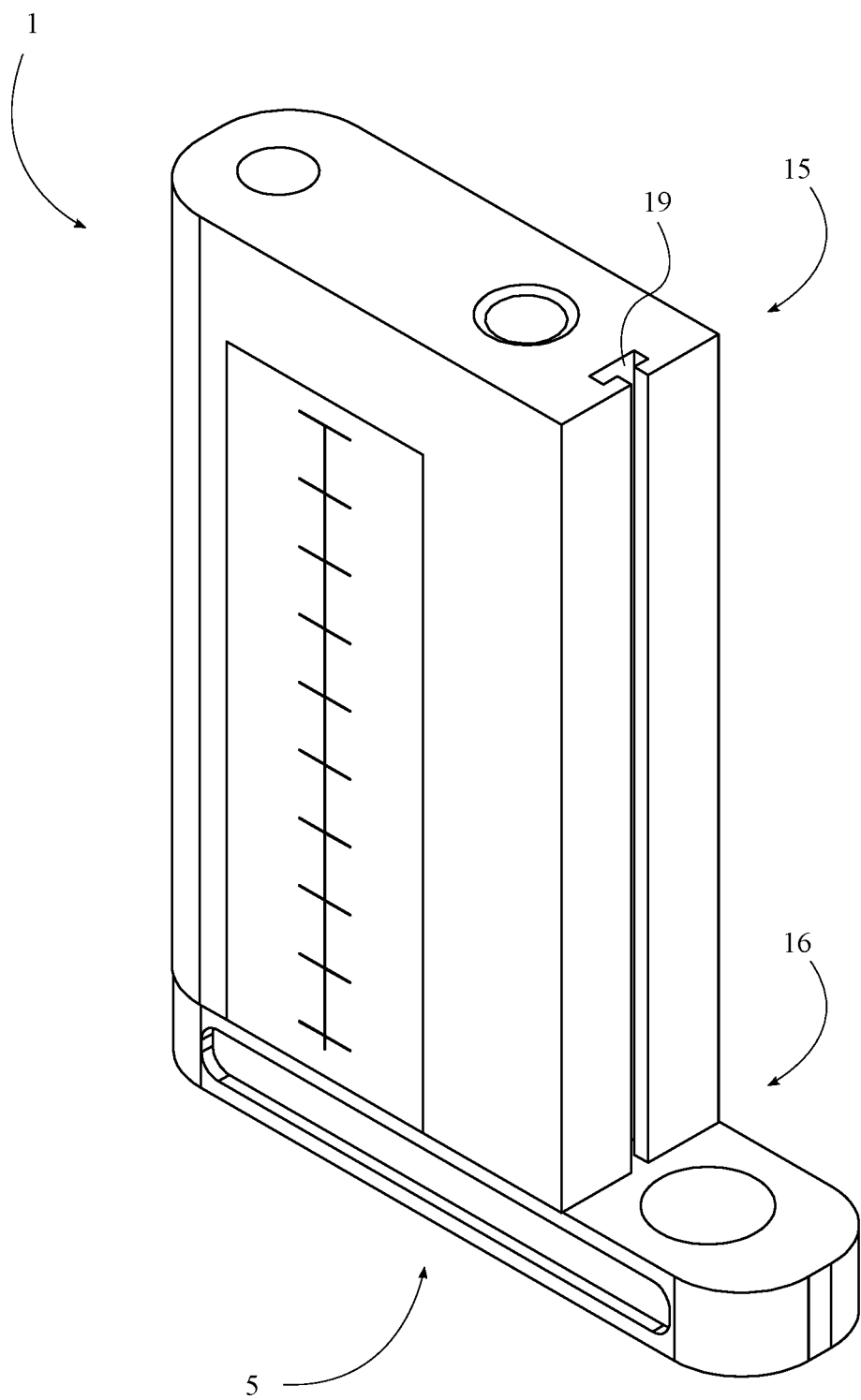
FIG. 7 is a perspective view of the sheath body showing the accessory attachment mechanism according to one embodiment.

Referring to FIG. 7, in some embodiments, the sheath body 1 further comprises an accessory attachment mechanism 19. The accessory attachment mechanism 19 allows the user to removably attach various accessories as desired, such as, but not limited to, the lighter sheath 10 or other accessories. Preferably, the accessory attachment mechanism 19 is laterally positioned on the sheath body. More particularly, in some embodiments the accessory attachment mechanism 19 is positioned laterally adjacent to the intake hole 12 opposite the mouthpiece hole 13. The accessory attachment mechanism 19 may be any means through which additional accessories such as the lighter sheath 10 may be affixed to the sheath body.

In some embodiments, the accessory attachment mechanism 19 is an accessory slot. The accessory slot traverses into the sheath body 1 at the top end 15. More specifically, in some embodiments the accessory slot traverses the entirety of the sheath body 1 from the top end 15 to the bottom end 16. Preferably, the accessory attachment slot is T-shaped; however, in various embodiments, the accessory attachment slot may comprise any other cross-sectional shapes that allow removable attachment of accessories to the sheath body 1. In other embodiments, the accessory attachment mechanism 19 may comprise other accessory attachment means, such as, but not limited to, magnetic attachment points, snaps, latches, or other fastening means.

In the preferred embodiment, when the present invention is fully assembled, with the cartridge 2 inserted fully upwards into the cartridge chamber 11, users will place a smoking content of their choice, generally dry herbs, into the perforated bowl 3 and place a lighter into the lighter sheath 10. Before actuating the lighter, the sliding cover 42 or the bowl cover, depending on the embodiment, must be moved until it is no longer covering the bowl, while the sliding cover 42 or the mouthpiece cover, depending on the embodiment, must be covering the mouthpiece hole 13. After lighter actuation, users may grasp the cartridge anchor 5 by its pair of grips 52 and slowly pull it and the cartridge 2 and sheath body 1 in opposite and directions. The relative translation of the magazine and the sheath will create a vacuum, pulling air from outside the device, through the plurality of apertures in the perforated bowl 3 and into the cartridge chamber 11. In addition to this, the vacuum will automatically draw the lighter's flame into the bowl. As the sheath body 1 and the cartridge 2 are drawn away from each other, smoke will be drawn downwards and accumulate within the cartridge chamber 11, due to the airtight seal between the inner surface of the cartridge chamber 11 and the seal attachment 9. Smoke will stop accumulating when the translation between the sheath body 1 and cartridge 2 cease. Users may utilize the scale 8 to ascertain when to stop the separation between the cartridge 2 and sheath body 1. During the smoke accumulation process, users may rotate the perforated bowl 3 about its rotational axis in order to light parts of the smoking content that is unlit. When enough smoke has accumulated within the cartridge chamber 11, the mouthpiece cover is to be pivoted or the sliding cover 42 is to be translated, until part or all of the mouthpiece hole 13 are visible. Users may then place their mouth over the mouthpiece hole 13 and inhale the smoke within the cartridge chamber 11 while simultaneously translating the cartridge 2 back into its starting position, within the cartridge chamber 11. The air pressure created from the cartridge 2 being moved back into its original position will force air out of the cartridge chamber 11.

One of the primary purposes of the present invention is to provide a means of dosage measurement. Medicinal herbs are often consumed through smoking as a means of treatment for various ailments, but it is difficult to precisely measure intake. To this end, in various embodiments of the present invention, various means may be employed to not only measure but also track historical usage and consumption. One simple means has already been mentioned; namely, the scale 8 on the viewing ports 18 as a means of visual measurement.

In other embodiments, electronic means of dosage measurement and tracking may be employed. Various embodiments utilize digital data acquisition, transfer and storage to track historical consumption while utilizing the present invention. Thus, a method of measuring and tracking use of the waterless vacuum based smoking apparatus of the present invention by executing computer-executable instructions stored on a non-transitory computer-readable medium is hereinafter provided.

For a given user, a user profile is initiated in a database. The user profile may be manually initiated through inputting a plurality of user attributes through a user interface such as a personal computer or mobile device application, or the user profile may be automatically generated upon first use of the present invention. The database may be any suitable storage medium, such as, but not limited to, a network connected database in a remote location, or internal storage housed within the sheath body 1. The present invention may additionally comprise any necessary electronic circuitry and components for facilitating the tracking functionality, such as, but not limited to, a wireless communication device such as radio frequency (RF) transmitter types including, but not limited to, Wi-Fi modules or Bluetooth modules, in addition to a data processing unit, a digital display, and any other electronic components necessary to facilitate the associated functionality herein disclosed.

In the method of the present invention, when the user uses the present invention to ingest smoke or vapor, a consumption data item is received from the user profile. The consumption data item comprises a plurality of attributes including, but not limited to, a dosage measurement and a time stamp. The consumption data item is stored in the database as being associated with the user profile. Aggregated usage statistics for the user profile are compiled from the consumption data items associated with the user profile in the database, and the aggregated usage statistics are displayed to the user profile upon request.

In some embodiments, the dosage measurement is determined by the displacement of the cartridge 2 within the cartridge chamber 11, as manually operated by the user. To this end, a linear movement sensor or a position sensor is operatively engaged between the sheath body 1 and the cartridge 2. The linear movement sensor detects a displacement distance of the cartridge 2 within the cartridge chamber 11, and the displacement distance is sent to the data base as the dosage measurement of the consumption data item. The linear movement sensor or position sensor may be any type of sensor which can determine the position of the cartridge 2 within the sheath, such as, but not limited to, a potentiometer, a laser rangefinder, or another sensor or suitable mechanism.

In some embodiments, a user interface is provided for the user so that the user may program a desired dosage through the user interface. Thus, when a dosage designation is received through the user interface, the dosage designation is sent to the database with the consumption data item as the dosage measurement. The dosage designation may simply be manually entered through the user interface and recorded separately from activating the displacement of the cartridge 2.

In some embodiments of the present invention, a motorized or electrical device incorporated into the apparatus and be used to automatically translate the cartridge 2 upwards and downwards. Upon pushing an externally mounted button, lever, or similar device, a signal will be sent that actuates a response that causes a translation between the cartridge 2 and sheath. The motorized or electrical components may be connected to a turn-able screw or other device that achieves an appropriate response. These changes may occur as long as the scope and objective of the present invention remains unchanged.

In some embodiments, the dosage preparation may be done automatically according to user input. Thus, a cartridge 2 motor is operatively integrated between the sheath body 1 and the cartridge 2, wherein the cartridge 2 motor displaces the cartridge 2 within the cartridge chamber 11. A dosage designation is received through the user interface, wherein the dosage designation corresponds to a specified displacement of the cartridge 2 within the cartridge chamber 11. The cartridge 2 motor is then activated in order to displace the cartridge 2 by the specified distance within the cartridge chamber 11, and the dosage designation and/or the specified displacement are sent to the database with the consumption data item as the dosage measurement.

In some embodiments, the dosage is determined through the length of time the user displaces the cartridge 2, for example by continually depressing a button. Thus, an activation is continually received through the user interface, and the cartridge 2 motor is activated while the activation signal is received. An activation time period is measured while the activation signal is received, and the cartridge 2 motor is deactivated if the activation signal ceases to be received. The activation time period is subsequently sent to the database as the dosage measurement.

In alternative embodiments of the present invention, the smoking device may be paired with Bluetooth technology that measures the exact density of the smoke that accumulates within the cartridge chamber 11. The Bluetooth technology would link particle density measurement sensors or other sensors within the smoking device to a mobile application that may be used to receive, monitor, and store data. The measurement sensors may be placed along the inside of the cartridge chamber 11 or built into the scale 8. These changes may occur as long as the scope and objective of the present invention remains unchanged.

In alternative embodiments, the present invention may also be used as a vaporizing device. With this, a battery and battery station will be housed within the sheath body 1, which will be connected to electrical components that will send a current to a heating element in order to vaporize vaporizable content. An LED (light emitting diode) strip or similar component will be attached to the outside of the sheath body 1 to indicate when the device is fully heated, currently heating, needs to be reheated, is low on battery, and so forth. The LED strip will also allow for easier use in settings with low visibility. Bluetooth may also be paired with the device for wireless control. These changes and additions may occur as long as the scope and objective of the present invention remains unchanged.

Although the invention has been explained in relation to its preferred embodiment, it is to be understood that many other possible modifications and variations can be made without departing from the spirit and scope of the invention as hereinafter claimed.

What is claimed is:

1. A waterless vacuum based smoking apparatus comprises:
    a sheath body;
    a cartridge;
    a cartridge anchor;
    the sheath body comprises a cartridge chamber, an intake hole, a mouthpiece hole, a top end, and a bottom end;
    the cartridge comprises a seal end, a storage cavity, and an open end;
    the cartridge chamber traversing into the sheath body from the bottom end of the sheath body toward the top end of the sheath body;
    the cartridge being engaged into the cartridge chamber;
    the seal end being hermetically sealed within the cartridge chamber between the top end of the sheath body and the open end of the cartridge;
    the intake hole and the mouthpiece hole traversing into the cartridge chamber;
    the storage cavity traversing into the cartridge from the open end toward the seal end;
    the cartridge anchor being removably attached to the cartridge at the open end, wherein the storage cavity is sealed when the cartridge anchor is attached to the cartridge;

the sheath body further comprises an accessory attachment mechanism; and the accessory attachment mechanism being laterally positioned on the sheath body.

2. The waterless vacuum based smoking apparatus as claimed in claim 1 comprises:
a perforated bowl;
at least one hole cover;
the perforated bowl being positioned atop the intake hole; and
the perforated bowl being releasably covered by the at least one hole cover.

3. The waterless vacuum based smoking apparatus as claimed in claim 1 comprises:
a filter;
the sheath body further comprises a filter cavity;
the filter cavity traversing into the sheath body; and
the filter being positioned within the filter cavity.

4. The waterless vacuum based smoking apparatus as claimed in claim 1 comprises:
the cartridge being slidably engaged into the cartridge chamber.

5. The waterless vacuum based smoking apparatus as claimed in claim 1 comprises:
the intake hole and the mouthpiece hole traversing through the top end into the cartridge chamber; and
the intake hole and the mouthpiece hole being spaced apart from each other on the sheath body.

6. The waterless vacuum based smoking apparatus as claimed in claim 1 comprises:
the accessory attachment mechanism being an accessory slot; and
the accessory slot traversing into the sheath body at the top end.

7. The waterless vacuum based smoking apparatus as claimed in claim 6 comprises:
the accessory slot traversing from the top end to the bottom end.

8. The waterless vacuum based smoking apparatus as claimed in claim 1 comprises:
at least one viewing port;
at least one translucent cover;
each of the viewing ports laterally traversing through the sheath body into the cartridge chamber; and
each of the translucent covers being attached within one of the viewing ports.

9. The waterless vacuum based smoking apparatus as claimed in claim 8 comprises:
at least one of the translucent covers comprises a scale; and
the scale being oriented vertically between the top end and the bottom end.

10. The waterless vacuum based smoking apparatus as claimed in claim 1 comprises:
the filter being a carbon fiber filter.

11. The waterless vacuum based smoking apparatus as claimed in claim 1 comprises:
the perforated bowl being rotatably connected atop the intake hole.

12. The waterless vacuum based smoking apparatus as claimed in claim 1 comprises:
the cartridge anchor being slidably engaged with the cartridge at the open end of the cartridge.

13. The waterless vacuum based smoking apparatus as claimed in claim 1 comprises:
the cartridge anchor comprises a grip; and
the grip being positioned laterally on the cartridge anchor.

14. The waterless vacuum based smoking apparatus as claimed in claim 1 comprises:
the filter cavity comprises an intake port and an exhaust port;
the intake port and the exhaust port laterally traversing into the sheath body; and
the intake port and the exhaust port being positioned opposite to each other across the filter.

15. The waterless vacuum based smoking apparatus as claimed in claim 1 comprises:
a lighter sheath; and
the lighter sheath traversing into the sheath body laterally adjacent to the intake hole opposite the mouthpiece hole.

16. The waterless vacuum based smoking apparatus as claimed in claim 1 comprises:
a lighter sheath; and
the lighter sheath being removably attached to the sheath body laterally adjacent to the intake hole opposite the mouthpiece hole.

17. The waterless vacuum based smoking apparatus as claimed in claim 1 comprises:
the at least one hole cover comprises a sliding cover; and
the sliding cover being slidably engaged at the top end of the sheath body between a filling position and a discharge position, wherein the sliding cover is positioned flush against the mouthpiece hole in the filling position, and wherein the sliding cover is positioned flush against the perforated bowl in the discharge position.

18. The waterless vacuum based smoking apparatus as claimed in claim 1 comprises:
the at least one hole cover comprises a bowl cover and a mouthpiece cover;
the bowl cover being removably positioned flush against the perforated bowl; and
the mouthpiece cover being removably positioned flush against the mouthpiece hole.

19. The waterless vacuum based smoking apparatus as claimed in claim 1 comprises:
a seal attachment;
the seal attachment being attached to the seal end of the cartridge; and
an outer perimeter of the seal attachment being dimensioned similarly to an inner wall of the cartridge chamber in order to hermetically seal the seal attachment against the inner wall.

\* \* \* \* \*